United States Patent [19]

Kubo

[11] 4,221,593

[45] Sep. 9, 1980

[54] GOLDEN-COLORED PRINTING INK

[75] Inventor: Hirotugu Kubo, Osaka, Japan

[73] Assignee: Mitsuboshi Printing Ink Co., Ltd., Osaka, Japan

[21] Appl. No.: 941,631

[22] Filed: Sep. 12, 1978

[30] Foreign Application Priority Data

Sep. 12, 1977 [JP] Japan ................................ 52-110117

[51] Int. Cl.² ...................... C09D 11/02; C09D 11/10
[52] U.S. Cl. ........................................ 106/20; 106/27;
106/290; 260/31.6; 260/33.6 R
[58] Field of Search ........................... 106/290, 20, 30;
260/33.6 R

[56] References Cited

U.S. PATENT DOCUMENTS

| | | | |
|---|---|---|---|
| 2,474,520 | 6/1949 | Fleming | 106/290 |
| 2,522,538 | 9/1950 | Rethwisch et al. | 106/290 |
| 2,762,712 | 9/1956 | Bloch et al. | 106/28 |
| 3,454,513 | 7/1969 | Azarian | 260/23 |

*Primary Examiner*—Carman J. Seccuro
*Attorney, Agent, or Firm*—Wenderoth, Lind & Ponack

[57] ABSTRACT

Golden-colored printing ink consisting of golden-colored powder of a brass alloy in the form of fine foils or flakes; and a vehicle essentially comprising a synthetic resin varnish which never affects said golden-colored powder, such as changes in the color and property thereof, and having an agent which is adapted to prevent change in the color and property of said golden-colored powder; said golden-colored powder and said vehicle being fully stirred and mixed with each other to form a sol.

7 Claims, No Drawings

GOLDEN-COLORED PRINTING INK

SUMMARY OF THE INVENTION

It is an object of the invention to provide golden-colored printing ink which is very suitable for printing, has no change in property and color even if it is stored for a long time, is more easily handled on printing, and is capable of producing golden-colored prints having a satisfactory golden-colored luster.

Golden-colored printing ink according to the invention is obtained by adding a golden-colored powder of a brass alloy, including aluminum, which is in the form of fine foils or flakes and, at the surfaces, has been treated with fatty acid, to a vehicle which essentially comprises various synthetic resin varnishes and further includes a gel varnish of synthetic resin varnishes of the same composition as the aforementioned synthetic resin varnishes and a gelling agent added thereto, an agent for preventing changes in the color and property and a solvent, and then by stirring and mixing them well.

DESCRIPTION OF THE PRIOR ART

The following two methods are known for the so-called golden printing.

(A) The so called bronze powder applying method.

Highly adhesive ink named a "bronzing medium" is primarily applied to portions of the web or paper necessary for a golden-colored appearance. Next, brass powder (hereinafter referred to as golden-colored or "bronze powder") named "scattering bronze powder" is spattered on the bronzing medium applied portions of the web, while the bronzing medium is not dried and adhesive, to adhere the bronze powder to the bronzing medium. This is effected by bronze powder applying machine called a "bronze machine", which is separately provided from a printing machine. Scattering bronze powder usually has a particle diameter of 50 to 100 microns. Excessive bronze powder which has not stuck to the bronzing medium is removed by a brush or the like from the surface of the web and collected for another printing.

In such bronze powder applying method, however, the bronze powder applying machine, such as the bronze machine, is essentially used, which causes the operation to be troublesome and complicated and also the printing cost to be higher. In addition, when bronze powder is scattered and while excessive bronze powder is removed and collected, the bronze powder tends to fly apart, which causes powder to be wasted and also to adversely affect the health of the operator.

It is technically and economically difficult to prevent bronze powder from flying apart. Furthermore, the bonding strength between the bronze powder and bronzing medium is very weak and the bronze powder tends to be removed from the surface of bronzing medium. Thus, it can be removed only by softly contacting the prints, and therefore one's fingers and clothes are soiled. In a case wherein that the print is a food wrapping paper, the removed bronze powder attaches to the food to form verdigris thereon, which is harmful to the human body.

(B) The method for mixing bronze powder or golden-colored paste with vehicle immediately before printing to make golden-colored ink.

Of late, with the improvement of the bronze powder producing art, there has been developed such fine bronze powder (less than 10 micron) as suitable for printing. At the same time that such bronze powder is used as a material for golden-colored ink, a vehicle of various synthetic resin varnishes has been is gradually popularized for common printing ink. Thus, there has been proposed the idea that bronze powder is mixed with and diffused into a synthetic resin varnish to thereby produce golden-colored ink. In this case, however, a synthetic resin varnish as the vehicle includes a free acid and a small amount of sulfide, which gradually reacts with the fatty acid layer or bronze powder to cause the following drawbacks:

($b_1$) Due to interfacial tension of the fatty acid layer, the effect of the floating golden-colored powder on the surface of the vehicle (hereinafter referred to as "relief effect") is decreased to thereby lose metallic luster which is to appear on the surface of the print.

($b_2$) Due to the chemical change of the bronze powder itself (reaction with the component of varnish or oxidation), the metallic luster of bronze powder in itself is lost.

Furthermore, the synthetic resin varnish tends to make the ink gel, and therefore, bronze powder and synthetic resin varnish cannot be reserved in the condition of golden-colored ink in the form of a sol which is obtained by previously mixing them. Thus, immediately before printing, bronze powder, if necessary, as it is pasted with mineral oil, has to be added to and mixed with the synthetic resin varnish. Actually, bronze powder, if necessary, is it pasted with mineral oil, and the vehicle of the synthetic resin varnish are separately canned and they are sold as a set.

In this method, the density of the golden-colored ink can be artibrarily determined, but in the printing operation much labor and time is required for mixing the pasted bronze powder and vehicle of the synthetic resin varnish to thereby lower the effectiveness of the operation. In addition, the ratio and condition of the mixture should be constant under the exact and detailed data in order to obtain a uniform golden-colored surface of the print. This requires a professional technique. Furthermore, since the mixing operation should be made immediately before printing, the printing operation is troublesome and complicated as well as requiring experience.

DETAILED DESCRIPTION OF THE INVENTION

This invention eliminates the drawbacks of the prior art golden-colored printing method according to the bronze powder applying method and preparation of golden-colored ink by mixture of the bronze powder and the synthetic resin varnish just before printing. The ink of the invention can be immediately used in the same manner as common printing ink (one made by diffusing color paints such as red paint, blue paint, black paint and the like into a vehicle) and has no change if kept in reserve for a long time.

To this end, the golden-colored powder is composed of a brass alloy (including aluminum) in view of the proof of bronze or brass powder.

In addition, a vehicle which has an effect on the bronze powder is necessary to meet the following requirements:

1. to have no change with time,
2. to impart a good relief to the bronze powder and not to prevent such relief, and
3. to have no adverse effects on the metallic luster of the bronze powder.

According to the invention, the composition of the vehicle for the golden-colored ink is as follows: synthetic resin varnish (compound varnish of a phenol resin and xylene resin); a gel varnish (which is composed of a synthetic resin of the same component as the aforementioned synthetic resin and gelled by an aluminum alcoholate compound and aluminum chelate compound); a tung oil type compound varnish or petroleum solvent; and an amine compound which serves to improve the relief of bronze powder and to prevent change in its properties.

Bronze powder is formed of fine foils or flakes of less than 400 meshes. This powder is stirred with and diffused into a vehicle of the above-mentioned component by a butterfly mixer to form golden-colored printing ink of the invention.

It should be noted that the main components of the vehicle are the synthetic resin varnish and the gel varnish, and the tung oil type compound varnish and petroleum solvent serve to adjust the viscosity and fluidity of the vehicle, whereby golden-colored ink can be used in a usual block or off-set printing machine in the same manner as common printing ink.

Examples of the invention will be described hereinafter.

EXAMPLE 1 bronze powder: 60 parts by weight
synthetic resin varnish: 30 parts by weight
gel varnish: 10 parts by weight
tung oil type compound varnish: 3 parts by weight
amine compound: 0.4 parts by weight

EXAMPLE 2 bronze powder: 55 parts by weight
synthetic resin varnish: 35 parts by weight
gel varnish: 10 parts by weight
tung oil type compound varnish: 4 parts by weight
amine compound: 0.3 parts by weight

EXAMPLE 3 bronze powder: 52 parts by weight
synthetic resin varnish: 32 parts by weight
gel varnish: 16 parts by weight
petroleum solvent: 1 part by weight
amine compound: 0.2 parts by weight In Examples 1 to 3, the components were blended at the predetermined ratio and fully stirred and combined by a butterfly mixer for one or two hours. After standing for 2 to 12 hours, the products were obtained. It was found that the products of all Examples were excellent golden-colored printing inks which accomplished the objects of the invention.

In these Examples, the golden-colored or bronze powder, that is, brass powder was formed of fine foils or flakes of less than 400 meshes and at the surface was treated with fatty acid. The ratio of aluminum included in the brass powder should be determined in consideration of its brilliancy, luster, tone of color and proof, and it is most preferably 0.5 to 1.0 percent by weight.

Although in the above examples, the synthetic resin varnish was formed of a combination of a phenol resin and a xylene resin, it may be formed of a synthetic resin or a selected compound, such as cumarone resin, cyclorubber resin or the like which meets the afore-mentioned requirements 1 to 3 of the vehicle.

A gelling agent of an aluminum alcoholate compound or an aluminum chelate compound, which is included in the gel varnish, should be selected in consideration of its dryness and stability. Aluminum secondary butylate, mono-secondary butoxyl aluminum isopropylate, aluminum ethyl acetoacetate and ethyl acetoacetate aluminum diisopropylate may be used, for example.

The amine compound which serves to improve the relief of the bronze powder and to prevent change in its property and color should be properly selected from the group of aliphatic primary amines of $C_8$ to $C_{18}$. Stearyl amine, oleyl amine, coconut amine and the like may be used, for example.

Since the golden-colored printing ink of the invention particularly comprises bronze powder of a brass alloy, including aluminum, the prevention of the change in color of the bronze powder is improved, which causes the brilliancy of its color to be hardly eliminated. Rather, the aluminum included in bronze powder, even in small amounts, causes the brilliancy of the bronze powder to be increased.

It should be noted that since the golden-colored ink of the invention is in the form of a sol, it need not be kneaded by a chilled roll. Thus, the golden-colored ink of the invention never loses its brilliancy of color which sometimes tends to happen because; the bronze powder is in the form of flakes which have a large area of golden color, which flakes tend to be deformed into fine polyhedrons or grains having a small area of golden color because the bronze powder is crushed between rollers of the chilled roll. The present invention eliminates this drawback.

According to the invention, the bronze powder in the form of fine and extremely thin foils or flakes never loses its configuration and relief effect and is diffused into the vehicle in the form of flakes. Thus, the brilliancy of the golden color of bronze powder is never lost.

Furthermore, the bronze powder is suitable for printing because it is very fine at 2 to 10 microns. More particularly, in case that the bronze powder is rough, the printing property tends to be lost due to poor transcription to the printing plates or blanket. In addition, some troubles occur during the printing operation and poor prints are obtained due to emulsification of the ink. According to the present invention, the afore-mentioned drawbacks are eliminated, and therefore, printing surfaces of extremely minute bronze powder can be obtained.

Furthermore, since gel varnish includes a gelling agent of aluminum alcoholate or aluminum chelate, the stability of gel varnish is improved and the drying of the vehicle (or ink) is facilitated.

The ink of the invention is in the form of a sol similar to conventional printing ink (which is made by diffusing colored paints into the vehicle), and as a result it may be used similar to conventional printing ink during printing by a block or off-set printing machine, while exhibiting good printing properties. Especially, it imparts a good appearance to the prints in a process block printing.

In addition, according to the ink of the invention, the bronze powder is neither precipitated nor changes in its color and properties during its preservation over a long period of time and therefore it can be used in optimum condition, which means that the printing can be satisfactorily conducted.

Furthermore, the bronze powder on the prints of the present invention are never removed by friction.

What is claimed is:

1. A golden-colored printing ink consisting essentially of a golden-colored powder and vehicle comprising a combination of a synthetic resin varnish; a gel varnish; a tung oil compound varnish or a petroleum solvent, and an amine compound which serves to improve the relief of the golden-colored powder and to prevent change in its color and properties, said golden-colored powder being a brass alloy, including aluminum in the form of fine foils and treated at the surface with a fatty acid, said vehicle and said golden-colored powder being in the form of a sol and wherein said synthetic resin varnish is composed of a phenol resin and a xylene resin, and said gel varnish is composed of a compound varnish of the same component as said synthetic resin varnish with at least one gelling agent added thereto selected from the group consisting of aluminum alcoholate compounds and aluminum chelate compounds, said gel varnish being present in an amount of 10–16% by weight, based on the weight of the printing ink.

2. A golden-colored printing ink as set forth in claim 1, wherein said golden-colored powder is composed of a brass alloy including aluminum in amounts of 0.5 to 1.0 percent by weight.

3. A golden-colored printing ink as set forth in claim 1, wherein said golden-colored powder is in the form of fine foils which are less than 400 meshes in size or range from 2 to 10 microns.

4. A golden-colored printing ink as set forth in claim 1, wherein said vehicle and said golden-colored powder are stirred and mixed with each other for 1 to 2 hours and thereafter allowed to stand for 2 to 12 hours.

5. A golden-colored printing ink as set forth in claim 1, wherein said amine compound is composed of a primary amine of a $C_8$ to $C_{18}$ fatty acid.

6. A golden-colored printing ink as set forth in claim 1, wherein said golden-colored ink consists essentially of the following components:
  golden colored powder: 52 to 60 (by weight)
  synthetic resin varnish: 30 to 35 (by weight)
  gel varnish: 10 to 16 (by weight)
  tung oil type compound varnish: 1 to 4 (by weight)
  amine compound: 0.1 to 0.5 (by weight).

7. A golden-colored printing ink as set forth in claim 1, wherein said gelling agent is selected from the group consisting of aluminum secondary butylate, monosecondary butoxyl aluminum isopropylate, aluminum ethyl acetoacetate, and ethyl acetoacetate aluminum diisopropylate.

* * * * *